US006235834B1

(12) United States Patent
Gee et al.

(10) Patent No.: US 6,235,834 B1
(45) Date of Patent: May 22, 2001

(54) EMULSION CONTAINING SILICONE PARTICLES OF LARGE SIZE

(75) Inventors: Ronald Paul Gee; Burt Michael Wrolson, both of Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/352,005

(22) Filed: Jul. 12, 1999

(51) Int. Cl.$^7$ .................................................... C08L 83/04

(52) U.S. Cl. ............................................................ 524/837

(58) Field of Search ............................................. 524/837

(56) References Cited

U.S. PATENT DOCUMENTS

| | | | |
|---|---|---|---|
| 3,294,725 | 12/1966 | Findlay | 260/29 |
| 4,661,556 | * 4/1987 | Huebner et al. | 524/745 |
| 4,990,555 | 2/1991 | Trego | 524/424 |
| 5,302,658 | 4/1994 | Gee | 524/732 |
| 5,504,150 | 4/1996 | Gilson | 524/837 |
| 5,726,270 | * 3/1998 | Craig | 528/23 |
| 5,763,505 | * 6/1998 | Derian et al. | 523/322 |
| 5,856,402 | * 1/1999 | Craig et al. | 524/837 |
| 5,942,574 | * 8/1999 | Hosokawa et al. | 524/837 |

OTHER PUBLICATIONS

Journal of Polymer Science, vol. 20, pp. 3351–3368 (1982).

* cited by examiner

Primary Examiner—Margaret G. Moore
(74) Attorney, Agent, or Firm—James L. De Cesare

(57) ABSTRACT

Dialkyl sulfonic acid catalysts such as dialkyl benzene sulfonic acids, dialkyl naphthalene sulfonic acids, salts of dialkyl benzene sulfonic acids, and salts of dialkyl naphthalene sulfonic acids, are used to prepare emulsions containing particles of organopolysiloxanes having an average particle diameter in the emulsion of at least one micron ($\mu$m) A silanol endblocked siloxane is used as an oligomer and has the structure

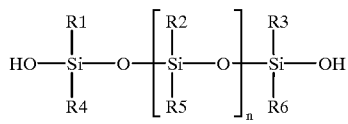

wherein R1 to R6 are alkyl or aryl groups such as methyl, ethyl, propyl, butyl, pentyl, hexyl, and phenyl; and n has a value such as to provide oligomers with a viscosity ranging from about 20 to about 100,000 centipoise (mPa·s). The emulsified oligomer is then polymerized with the catalyst to form an organopolysiloxane polymer having a viscosity which can be as high as about 10 million centipoise (mPa·s).

6 Claims, No Drawings

EMULSION CONTAINING SILICONE PARTICLES OF LARGE SIZE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to emulsions containing silicone particles of large size in which the emulsion is prepared by first emulsifying a silanol endblocked siloxane oligomer to large particles using a dialkyl sulfonic acid as the anionic surfactant, and then polymerizing the emulsified larger particles of silanol endblocked siloxane oligomer to a siloxane polymer of higher viscosity and/or higher molecular weight using a condensation specific acid catalyst.

Dialkyl sulfonic acids are most preferred as the surfactant, as these compounds possess the capability of functioning as the anionic surfactant for purposes of the emulsification, as well as functioning as the condensation specific acid catalyst for purposes of the polymerization.

In another embodiment, a different type of anionic surfactant or a nonionic surfactant could be used in the emulsification step, and the dialkyl sulfonic acid could be used as the condensation specific acid catalyst in the subsequent polymerization step.

BACKGROUND OF THE INVENTION

The advantages of emulsions containing silicones having a large particle size, i.e., 1–100 micron (micrometer/$\mu$m), is well documented in the patent literature, as for example in U.S. Pat. No. 5,302,658 (Apr. 12, 1994). While U.S. Pat. No. 5,302,658 provides for the production of emulsions containing large particle size silicone polymers, it does so by using surfactants to emulsify high viscosity silicone polymers which are difficult to handle and typically in short supply on a commercial scale. By way of contrast, the present invention in the most preferred embodiment, uses an anionic surfactant capable of functioning as an emulsifier to emulsify a silicone oligomer to a large particle size, and capable of functioning as an acid catalyst to polymerize the silicone oligomer, emulsified in the large size particles, to a high viscosity polymer.

These types of disadvantages are also present in U.S. Pat. No. 5,504,150 (Apr. 2, 1996), which while suggesting that a sulfonic acid catalyst can be employed, does not suggest the use of a dialkyl sulfonic acid as the catalyst. U.S. Pat. No. 5,504,150 also requires the use of expensive and complicated equipment including a reaction chamber, shearing and inversion devices, and collection vessels, to convert high molecular weight polymers to emulsions, in comparison to the present invention in which oligomers are first emulsified and then polymerized to higher molecular weight species using simple mechanical agitation.

While U.S. Pat. No. 3,294,725 (Dec. 27, 1966) prepares emulsions containing silicone particles by emulsifying siloxane oligomers using an anionic or a nonionic surfactant, and then polymerizing the emulsified oligomer particles to siloxane polymers of higher viscosity using condensation specific acid catalysts, the catalysts are not dialkyl sulfonic acids. In addition, U.S. Pat. No. 3,294,725 is silent with regard to the particular size of the particles, and where reference is made to the particles, they are merely described as being of "extremely fine particle size" or "so small that they cannot be resolved under an optical microscope".

Thus, U.S. Pat. No. 3,294,725 teaches against preparing an emulsion as contemplated herein, wherein the particle size is at least one micron ($\mu$m) in diameter, preferably greater than 10 micron ($\mu$m) in diameter. In fact, U.S. Pat. No. 3,294,725 teaches that a small particle size of siloxane reactant, i.e., high surface area, is desirable to get reasonable reaction rates.

Furthermore, it is known that the condensation polymerization rate of an emulsified siloxane oligomer is proportional to the total surface area of the siloxane oligomer particles in water, and therefore inversely related to the particle size. For example, reference may be had to the *Journal of Polymer Science*, Volume 20, Pages 3351–3368, (1982). Because of this, condensation polymerization rates are too slow to be practical in emulsions of siloxane oligomers having a particle size greater than about one micron ($\mu$).

By way of contrast, the present invention is not limited according to such conventional wisdom, as it is believed that the condensation polymerization reaction of the siloxane oligomer occurs inside the particle rather than at the surface. Therefore, fast condensation polymerization rates have been observed according to this invention, and the rate does not decrease with increasing size of the particles.

Similarly, U.S. Pat. No. 4,990,555 (Feb. 5, 1991) fails to teach the use of siloxane oligomers of large particle size, and is further limited to the extent that the amount of water allowed in the process is taught to be less than one percent by weight. The process of the present invention by way of comparison is enabled to use 10–90 times as much water, without suffering any of the disadvantages noted in U.S. Pat. No. 4,990,555.

Thus, U.S. Pat. No. 4,990,555 teaches that the water concentration must be less than one percent by weight in order to obtain fast polymerization rates. In contrast, the polymerization rate in the process according to the present invention does not depend heavily on the water concentration over a very broad range, i.e., 10–90 percent by weight. The reason is that in the present process, an oil-in-water emulsion is formed in which polymerization occurs within and at the surface of the emulsion particles.

Furthermore, the process taught in U.S. Pat. No. 4,990,555 is directed to the bulk polymerization of siloxanes, and is not adapted to function for preparing an emulsion. This is because it is nearly impossible, as a practical matter, to prepare an emulsion in which an oil phase is emulsified in less than one percent by weight of water. The advantage of the present invention, therefore, resides in the ability to carry out the polymerization in water, and this eliminates the common handling problems frequently associated with polymers of high viscosity, i.e., molecular weight. For example, in an emulsion, the viscosity of the polymer forming the dispersed particles has a negligible effect on the viscosity of the emulsion itself. Thus, it is possible to prepare an emulsion containing for example, 50 percent by weight of a one million centipoise (mPa·s) polymer, that has a viscosity of only about 10–100 centipoise (mPa·s). By this means, handling and pumping of high viscosity polymers can be readily facilitated.

BRIEF SUMMARY OF THE INVENTION

This invention relates to a method of preparing an emulsion containing particles of an organopolysiloxane with an average particle diameter of at least one micron ($\mu$). The emulsion is prepared by (i) combining a silanol endblocked siloxane oligomer, water, and a nonionic surfactant or an anionic surfactant; (ii) emulsifying the silanol endblocked siloxane oligomer to form particles in the emulsion with an average particle diameter of at least one micron ($\mu$), by agitating the ingredients or by using a high shear device; (iii) adding a condensation specific acid catalyst to the emulsion of silanol endblocked siloxane oligomer; (iv) polymerizing the silanol endblocked siloxane oligomer to form an organopolysiloxane polymer; and (v) continuing polymerizing step (iv) until the resulting organosiloxane polymer has the desired increase in viscosity, which is preferably a viscosity in the range of about 20,000 to about ten million centipoise (mPa·s).

The condensation specific acid catalyst most preferred is a dialkyl sulfonic acid catalyst such as a dialkyl benzene sulfonic acid, or a dialkyl naphthalene sulfonic acid.

Emulsions prepared according to this invention are capable of functioning as a means of delivering polymers of high molecular weight and tailored rheological properties to the human body, i.e., as in a shampoo base to provide styling and conditioning benefits to human hair, or as a delivery mechanism for use in skin care applications. They can also be used in paper coating, textile coating, and home care applications, for delivering high molecular weight polymers to various types of surfaces and substrates.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

The silanol endblocked siloxane oligomer used herein has a structure which can be represented generally by the formula shown below:

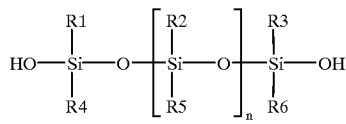

In the formula, the R1 to R6 groups generally comprise an alkyl group containing 1–6 carbon atoms such as methyl, ethyl, propyl, butyl, pentyl, and hexyl; an aryl group such as phenyl; or alkyl and aryl groups. The value of n can vary from 2–300, thus providing oligomers having a viscosity at 25° C. ranging from about 20 to about 100,000 centipoise (mPa·s).

Most preferred are silanol endblocked dimethylsiloxane oligomers of the structure shown below:

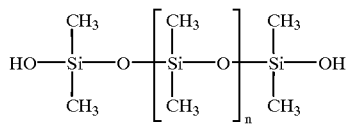

The silanol endblocked dimethylsiloxane oligomer may also contain small amounts of R'SiO$_{3/2}$ trifunctional "T" units at random locations in the oligomer chain. This provides a point of branching, and three or more silanol end groups which provide subsequent growth at three or more reaction sites in the same molecule, during the silanol-silanol condensation polymerization.

A trialkoxysilane may also be included during the polymerization process to achieve the same result. Thus, trialkoxysilanes undergo hydrolysis with water to form R'Si(OH)$_3$ which participates in the condensation polymerization, or the trialkoxysilane can react directly with silanols of the siloxane oligomer forming an ≡SiO bond and liberating an alcohol molecule.

Some examples of suitable trialkoxysilanes which can be employed are methyltrimethoxysilane, ethyltrimethoxysilane, propyltrimethoxysilane, n-butyltrimethoxysilane, hexyltrimethoxysilane, octyltrimethoxysilane, octyltriethoxysilane, dodecyltrimethoxysilane, dodecyltriethoxysilane, and phenyltrimethoxysilane.

The catalyst used herein is a dialkyl sulfonic acid catalyst, including dialkyl benzene sulfonic acids of the formula R$_2$C$_6$H$_3$SO$_3$H, dialkyl naphthalene sulfonic acids of the formula R$_2$C$_{10}$H$_5$SO$_3$H, salts of dialkyl benzene sulfonic acids of the formula R$_2$C$_6$H$_3$SO$_3$M, and salts of dialkyl naphthalene sulfonic acids of the formula R$_2$C$_{10}$H$_5$SO$_3$M, where R represents an alkyl group having 1–20 carbon atoms, and M represents ammonium NH$_4^+$ or an alkali metal such as lithium, sodium, or potassium.

If the catalyst is the salt of the dialkyl sulfonic acid, it is necessary to add a strong acid such as hydrochloric acid or sulfuric acid to generate the dialkyl sulfonic acid from the salt.

Some representative catalysts which can be used include compounds such as di(n-propyl) benzene sulfonic acid, di(tert-butyl) benzene sulfonic acid, dihexyl benzene sulfonic acid, dioctyl benzene sulfonic acid, dinonyl benzene sulfonic acid, didodecyl benzene sulfonic acid, distearyl benzene sulfonic acid, ditetradecyl benzene sulfonic acid, dihexadecyl benzene sulfonic acid, dioctadecyl benzene sulfonic acid, di(2-ethylhexyl) benzene sulfonic acid, di(2-butyloctyl) benzene sulfonic acid, di(2-amylnonyl) benzene sulfonic acid, di(n-propylheptyl) benzene sulfonic acid, and salts thereof; di(n-propyl) naphthalene sulfonic acid, di(isopropyl) naphthalene sulfonic acid, di(sec-butyl) naphthalene benzene sulfonic acid, dihexyl naphthalene sulfonic acid, dioctyl naphthalene sulfonic acid, dinonyl naphthalene sulfonic acid, didodecyl naphthalene sulfonic acid, distearyl naphthalene sulfonic acid, ditetradecyl naphthalene sulfonic acid, dihexadecyl naphthalene sulfonic acid, di(2-ethylhexyl) naphthalene sulfonic acid, di(2-ethyloctyl) naphthalene benzene sulfonic acid, and salts thereof.

Commercial products representative of such catalysts are SYNEX® DN-052 and NACURE® 1052, both trademarks of King Industries, Norwalk, Conn. for the product dinonyl (C$_9$) naphthalene sulfonic acid; ARISTONIC Acid VH, a mixture of unspecified monoalkyl and dialkyl benzene sulfonic acids, and ARISTONIC ACID E, a C$_{12}$ dialkyl benzene sulfonic acid, both products of Pilot Chemical Company, Santa Fe Springs, Calif. The approximate structures of such materials are shown below:

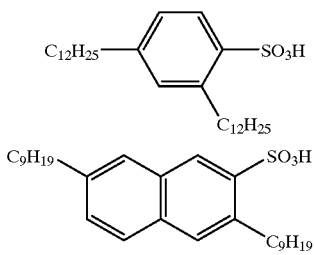

According to the method of the present invention, the silanol endblocked siloxane oligomer is first mechanically emulsified in water to a particle size greater than one micron ($\mu$), preferably greater than 10 micron ($\mu$), using an anionic or a nonionic surfactant, and then the dialkyl sulfonic acid catalyst is added to polymerize the emulsified larger particle size silanol endblocked siloxane oligomer to the desired polymer viscosity.

However, this two step procedure can be greatly simplified when dialkyl sulfonic acids are employed, for the reason that such compounds are capable of functioning as the anionic surfactant for purposes of the emulsification step, as well as functioning as the acid catalyst for purposes of the polymerization step.

Useful anionic surfactants are alkali metal sulfosuccinates; sulfonated glyceryl esters of fatty acids such as sulfonated monoglycerides of coconut oil acids; salts of sulfonated monovalent alcohol esters such as sodium oleyl isothionate; amides of amino sulfonic acids such as the sodium salt of oleyl methyl tauride; sulfonated products of fatty acid nitriles such as palmitonitrile sulfonate; sulfonated aromatic hydrocarbons such as sodium alpha-naphthalene monosulfonate; condensation products of naphthalene sulfonic acids with formaldehyde; sodium octahydro anthracene sulfonate; alkali metal alkyl sulfates; ether sulfates having alkyl groups of eight or more carbon atoms; and alkylaryl sulfonates having one or more alkyl groups of eight or more carbon atoms.

Useful nonionic surfactants preferably have a hydrophilic-lipophilic balance (HLB) of 10–20. Nonionic surfactants with HLB of less than 10 may be used, but the emulsion stability may be very poor due to limited solubility of the nonionic surfactant in water. When using a nonionic surfactant with HLB less than 10, a nonionic surfactant with HLB greater than 10 should be added during or after polymerization.

Commercial types of nonionic surfactants can be exemplified by 2,6,8-trimethyl-4-nonyloxy polyethylene oxyethanols (6EO) and (10EO) sold under the trademarks TERGITOL® TMN-6 and TERGITOL® TMN-10; alkyleneoxy polyethylene oxyethanol ($C_{11-15}$ secondary alcohol ethoxylates 7EO, 9EO, and 15EO) sold under the trademarks TERGITOL® 15-S-7, TERGITOL® 15-S-9, TERGITOL® 15-S-15; other $C_{11-15}$ secondary alcohol ethoxylates sold under the trademarks TERGITOL® 15-S-12, 15-S-20, 15-S-30, 15-S-40; and octylphenoxy polyethoxy ethanol (40EO) sold under the trademark TRITON® X-405. All of these surfactants are sold by Union Carbide Corporation, Danbury, Conn.

Other types of commercial nonionic surfactants are nonylphenoxy polyethoxy ethanol (10EO) sold under the tradename MAKON 10 by Stepan Company, Northfield, Ill.; polyoxyethylene 23 lauryl ether (Laureth-23) sold commercially under the tradename BRIJ 35L by ICI Surfactants, Wilmington, Del.; and RENEX 30, a polyoxyethylene ether alcohol with an HLB of about 14.5 sold by ICI Surfactants, Wilmington, Del.

The reaction to polymerize the emulsified silanol endblocked siloxane oligomer is carried out in a simple reactor containing water, at least one anionic (ionic) surfactant or nonionic surfactant, and a catalyst.

The emulsion contains a silicone concentration of 10–90 percent by weight of the total emulsion, preferably 25–60 percent. While emulsions with less than 10 percent silicone content can be made, such emulsions hold little or no economic value.

The catalyst is present in the reaction medium at levels of 0.05–25 percent by weight of the total emulsion. The anionic surfactant is present at 0.05–25 percent by weight of the total emulsion, preferably 0.5–20 percent by weight. The nonionic surfactant is present at 0.1–40 percent by weight of the total emulsion, preferably 0.5–30 percent by weight. Water is present at 10–90 percent by weight of the total emulsion, preferably 20–80 percent by weight.

The method is carried out by creating an emulsion containing the silanol endblocked siloxane oligomer, anionic surfactant or nonionic surfactant, water, and catalyst. The emulsion can be processed at room temperature or it can be heated with agitation at a polymerization reaction temperature until the silanol endblocked siloxane oligomer has reached the desired polymer viscosity or molecular weight by condensation polymerization.

By condensation herein is meant a chemical reaction in which two or more molecules of an oligomer combine with the separation of water or some other simple substance such as an alcohol. In particular, the condensation polymerization reaction which is characteristic of the process according to the present invention involves and results in the formation of polysiloxanes by the condensation of organosilicon oligomers containing the silanol group $\equiv$SiOH.

Polymerization reaction temperatures are typically above the freezing point, but below the boiling point of water. Pressures above or below atmospheric pressure allow operation outside of this range. At temperatures below room temperature, the polymerization reaction may proceed more slowly. The preferred temperature range is 1–95° C., most preferably 20–50° C.

The polymerization reaction can be stopped at the desired level of polymerization of silanol endblocked siloxane oligomer by using known methods. It is preferred to stop the reaction when the largest amount of silanol endblocked siloxane oligomer has been reacted, i.e., condensed. Reaction times of less than 24 hours, typically less than 10 hours, are sufficient to achieve the desired polymer viscosity.

The methods for stopping the reaction encompass neutralization of the catalyst by addition of equal or slightly greater stoichiometric amounts of base. Either a strong or weak base may be used to neutralize the reaction. Care must be taken when using a strong base not to over neutralize, as it is possible to re-catalyze the reaction. It is preferred to neutralize with sufficient quantities of base such that the resulting emulsion has a pH of greater than 7 when an anionic surfactant is present.

Some examples of neutralizing agents which may be employed include sodium hydroxide, ammonium hydroxide, potassium hydroxide, triethanolamine (TEA), triethylamine, isopropyl amine, and hexamethyldisilazane.

Since emulsions are susceptible to microbiological contamination, a preservative may also be required, and representative compounds which may be employed include formaldehyde, DMDM hydantoin, 5-bromo-5-nitro-1,3-dioxane, methyl paraben, propyl paraben, sorbic acid, imidazolidinyl urea, and 5-chloro-2-methyl-4-isothiazolin-3-one which is a product sold under the tradename KATHON CG by the Rohm & Haas Company, Philadelphia, Penn.

EXAMPLES

The following examples are set forth in order to illustrate this invention in more detail.

Example 1

20 gram of a silanol endblocked siloxane oligomer were added to a four ounce glass jar. The silanol endblocked siloxane oligomer had a structure generally corresponding to the formula

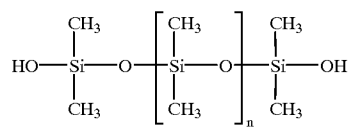

in which n had a value sufficient to provide a viscosity of approximately 75 centipoise (mPa·s). To the glass jar were added 0.64 gram of ARISTONIC ACID E, the $C_{12}$ dialkyl benzene sulfonic acid noted above, and 20 gram of deionized water. The concentration of ARISTONIC ACID E in the glass jar was about 1.6 percent by weight. A SONICATOR® Ultrasonic Probe (Model C-4), manufactured by Heat Systems, Inc., was placed into the inhomogeneous liquid present in the glass jar. The probe was attached to a SONICATOR® Ultrasonic Processor (Model XL-2020). The processor power was set to a reading of ten, and the mixture in the glass jar was sheared for about one minute. Heat was generated during this emulsification procedure, and it was allowed to dissipate to the ambient atmosphere. The temperature of the emulsion in the glass jar as a result of shearing reached 23° C. within about thirty minutes following completion of the emulsification. A Microtrac UPA 150 Particle Size Analyzer was used to measure the volume weighted mean particle size of the siloxane polymer particles present in the emulsion. The siloxane polymer particle size was determined to be 1.9 micron ($\mu$). Samples of the emulsion were withdrawn periodically, and the samples were neutralized to a pH of about seven, using a water solution containing about 85 percent by weight of triethanolamine. The siloxane polymer was extracted from the emulsion by adding to a container, 2–4 gram of the emulsion, 1.5 gram of anhydrous calcium chloride, 20 milliliter of methanol, and 25 milliliter of pentane. This mixture was shaken vigorously, added to a plastic centrifuge tube, and centrifuged at 3,000 rpm (314 rad/s) for about 15 minutes. The top layer was removed from the tube and stripped, yielding only the siloxane polymer. The shear viscosity of extracted siloxane polymer was measured using a Brookfield Model HBDV-III Viscometer. The siloxane polymer viscosity as a function of time is shown in Table I. It can be seen that the siloxane polymer viscosity was 730,000 centipoise (mPa·s), after the elapse of about seven hours. The rate of siloxane polymer growth as a function of time when plotted graphically, was nearly linear.

Example 2

Example 1 was repeated except that 0.40 gram of ARISTONIC ACID E was used instead of 0.64 gram, and the mixture in the glass jar was sheared for three minutes instead of one minute. The concentration of ARISTONIC ACID E in the glass jar was about 1.0 percent by weight. The siloxane polymer particle size was determined to be 1.1 micron ($\mu$). The siloxane polymer viscosity as a function of time is shown in Table I. This example demonstrates the effect of using a lower concentration of the acid catalyst.

Example 3

Comparative Example

Example 1 was repeated except that 0.40 gram of Bio-Soft S-100 was used instead of 0.64 gram of ARISTONIC ACID E. Bio-Soft S-100 is the tradename of Stepan Company, Northfield, Ill., for dodecyl benzene sulfonic acid (DBSA), a substituted aromatic acid having a structure conforming generally to the formula

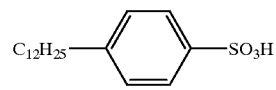

The concentration of DBSA in the glass jar was about 1.0 percent by weight. The mixture in the glass jar was sheared for 30 seconds instead of one minute. The siloxane polymer particle size was determined to be 0.9 micron ($\mu$). The siloxane polymer viscosity as a function of time is shown in Table I. Compared with Example 1, this comparative example demonstrates that improved results, in terms of the siloxane polymer viscosity attained versus time, can be obtained using dialkyl benzene sulfonic acids according Example 1 and the teaching of the present invention, instead of using monoalkyl benzene sulfonic acids as in this comparative example.

Example 4

Comparative Example

This comparative example demonstrates that the polymerization rate with a monoalkylsulfonic acid catalyst becomes reasonably fast when the particle size is relatively small, i.e., 0.34 micron ($\mu$). When compared with Example 3, i.e., 0.90 micron ($\mu$), the detrimental effect of increased particle size on siloxane oligomer condensation polymerization rate is apparent.

200.0 gram of de-ionized water and 20.0 gram of DBSA were added to a plastic beaker. The DBSA was allowed to dissolve while the mixture was stirred with an electric mixer. 1,000 gram of the silanol endblocked siloxane oligomer used in Example 1 were slowly added to the acid solution. After the siloxane oligomer addition was completed, 736.4 gram of de-ionized were quickly added to the acidic emulsion. The resultant emulsion was passed through a Model A Sonolator® manufactured by the Sonic Corporation, at 1,700 psi (11,730 kPa) with a 0.0005 in$^2$ (0.003×10$_{-4}$ m$^2$) orifice. This emulsion was then passed through a single stage homogenizer, manufactured by Gaulin Corporation, at 7,500 psi (51,750 kPa). The particle size of the siloxane polymer particles present in the emulsion was 0.34 micron ($\mu$m), as measured with a Nicomp Model 370 Submicron Particle Sizer. The emulsion was placed into a glass mixing vessel and cooled to approximately 22° C. Samples of the emulsion were withdrawn periodically, and the samples were neutralized to a pH of about seven, using a water solution containing about 85 percent by weight of triethanolamine. The polymer was extracted from these samples in the manner described in Example 1. The shear viscosity of the extracted siloxane polymer was measured using a Brookfield Model HBDV-III Viscometer. The siloxane polymer viscosity as a function of time is shown in Table I.

TABLE I

| Time | Viscosity - centipoise (mPa•s) | | | |
|---|---|---|---|---|
| (minutes) | Example 1 | Example 2 | Comp. Ex. 3 | Comp. Ex. 4 |
| 50 | 40,000 | 35,000 | — | — |
| 100 | 100,000 | 90,000 | — | — |
| 150 | 180,000 | 150,000 | 15,000 | 100,000 |
| 200 | 250,000 | 235,000 | 35,000 | 200,000 |
| 250 | 325,000 | — | 75,000 | 340,000 |
| 300 | 425,000 | — | 100,000 | 480,000 |
| 350 | 550,000 | — | 175,000 | 660,000 |
| 400 | 650,000 | — | 250,000 | 810,000 |
| 450 | 760,000 | — | 320,000 | 940,000 |

Example 5

This example illustrates the use of a nonionic surfactant to emulsify the siloxane oligomer before catalysis of the siloxane oligomer with a dialkylsulfonic acid.

To a plastic beaker was added 463 g water and 5.00 g of RENEX 30 nonionic surfactant, and while stirring with an electric mixer, 500 g of the silanol endblocked siloxane oligomer of Example 1 was added to the plastic beaker. After mixing for about 15 minutes, this coarse dispersion was homogenized by passing it once through a Manton-Gaulin Submicron Disperser at 3,000 psi (20,700 kPa). The resulting siloxane oligomer particle size was approximately 2.8 micron ($\mu$) as measured on a Coulter LS-130 Particle Sizer. 677.6 g of this emulsion was placed in a flask fitted with a stirrer rotating at 300 rpm (31 rad/s), and 14.0 g of SYNEX DN-052 dinonyl ($C_9$) naphthalene sulfonic acid was added. The emulsion contained one percent by weight of the dialkylsulfonic acid. A 25 g sample of the emulsion was withdrawn from the flask at hourly intervals, and the SYNEX DN-052 catalyst was neutralized with 0.30 g of an 85 percent solution of triethanolamine. The siloxane polymer was extracted from the emulsion samples as described in Example 1 and the siloxane polymer viscosity was measured. The results are shown in Table II.

Example 6

Comparative Example

Another emulsion of the siloxane oligomer was made and polymerized using the same procedure as in Example 5, except that 7.0 g of DBSA monoalkylsulfonic acid was used in place of the SYNEX DN-052 dialkylsulfonic acid catalyst. The emulsion had a particle size of approximately 3.4 micron ($\mu$) as measured on a Coulter LS-130 Particle Sizer. It contained one percent by weight of the monoalkylsulfonic acid. The results are shown in Table II and illustrate the slow polymerization rate in particles greater than one micron when using a monoalkylsulfonic acid as compared to the dialkylsulfonic acid of this invention.

Example 7

Example 5 was repeated except that homogenization using the Manton-Gaulin Submicron Disperser was omitted, enabling the formation of an emulsion having a very large particle size. The emulsion formed had a particle size of approximately 135 microns ($\mu$) as measured on a Coulter LS-130 Particle Sizer. The polymerization results are shown in Table II. Comparison of this example with Example 5 illustrates that the polymerization rate in larger size emulsion particles with a dialkylsulfonic acid actually increases, in contrast to decreasing polymerization rates when using monoalkylsulfonic acids.

Example 8

This example illustrates the inclusion of a small amount of a trialkoxysilane in the process.

Example 5 was repeated except that 10.0 g of propyltrimethoxysilane $CH_3CH_2CH_2Si(OCH_3)_3$ (one percent by weight based on the total weight of the emulsion) was added after the siloxane oligomer had been added. The polymer viscosity results are shown in Table II. The emulsion had a particle size of approximately 3.8 micron ($\mu$) as measured on a Coulter LS-130 Particle Sizer.

Example 9

This example illustrates polymerization at a higher temperature in order to increase the polymerization rate.

Example 8 was repeated except that the emulsion in the flask was heated to, and held at 40° C., prior to catalysis and during the polymerization. The polymer viscosity results are shown in Table I. The emulsion had a particle size of approximately 4.0 micron ($\mu$) as measured on a Coulter LS-130 Particle Sizer.

TABLE II

| Time | Viscosity - centipoise (mPa•s) | | | | |
|---|---|---|---|---|---|
| Minutes | Example 5 | Ex.6-Comp | Example 7 | Example 8 | Example 9 |
| 60 | 2,160 | 150 | 10,300 | 3,930 | 5,530 |
| 120 | 4,340 | 211 | 13,400 | 16,900 | 19,700 |
| 180 | 7,740 | 298 | 18,600 | 35,800 | 43,400 |
| 240 | 10,400 | 385 | 22,600 | 63,000 | 114,000 |
| 300 | 13,900 | 514 | 29,300 | — | — |
| 1,320 | — | — | — | rubbery | rubbery |

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of preparing an emulsion containing particles of an organopolysiloxane polymer with an average particle diameter of at least one micron ($\mu$m) comprising: (i) combining a silanol endblocked siloxane oligomer, water, and a nonionic or anionic surfactant; (ii) emulsifying the silanol endblocked siloxane oligomer to form particles with an average particle diameter of at least one micron ($\mu$m) by agitating or shearing the ingredients; (iii) adding a condensation specific acid catalyst; (iv) polymerizing the silanol endblocked siloxane oligomer to form an organopolysiloxane polymer; and (v) continuing polymerizing step (iv) until the resulting organopolysiloxane polymer has attained the desired increase in viscosity; the condensation specific acid catalyst being a dialkyl sulfonic acid catalyst which is selected from the group consisting of dialkyl benzene sulfonic acids of the formula $R_2C_6H_3SO_3H$, dialkyl naphthalene sulfonic acids of the formula $R_2C_{10}H_5SO_3H$, acidified salts of dialkyl benzene sulfonic acids of the formula $R_2C_6H_3SO_3M$, and acidified salts of dialkyl naphthalene sulfonic acids of the formula $R_2C_{10}H_5SO_3M$, where R represents an alkyl group having 1–20 carbon atoms, and M represents ammonium $NH_4^+$ or an alkali metal; the amount of water used for preparing the emulsion being 10–90 percent by weight based on the total weight of the emulsion.

2. A method according to claim 1 in which the silanol endblocked siloxane oligomer has the formula

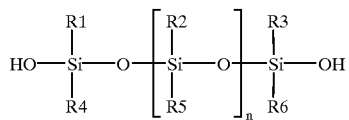

wherein R1 to R6 represent an alkyl group containing 1–6 carbon atoms or an aryl group, and n is 2–300, the silanol endblocked siloxane oligomer having a viscosity at 25° C. ranging from about 20 to about 100,000 centipoise (mPa·s).

3. A method according to claim 1 in which an anionic surfactant is used in step (i) which comprises the dialkyl sulfonic acid catalyst used in step (iii).

4. A method according to claim 1 in which the emulsion is prepared at temperatures in the range of 1–95° C.

5. An emulsion prepared according to the method defined in claim 1.

6. An emulsion according to claim 5 in which the organopolysiloxane polymes has an average particle diameter of at least about 10 micron ($\mu$m) and a viscosity in the range of about 20,000 to about ten million centipoise (mPa·s).

* * * * *